April 27, 1965   E. MAIER ETAL   3,180,915
METHOD FOR THE TREATMENT OF RAW MATERIALS
Filed Jan. 9, 1961   3 Sheets-Sheet 1
Fig. 1
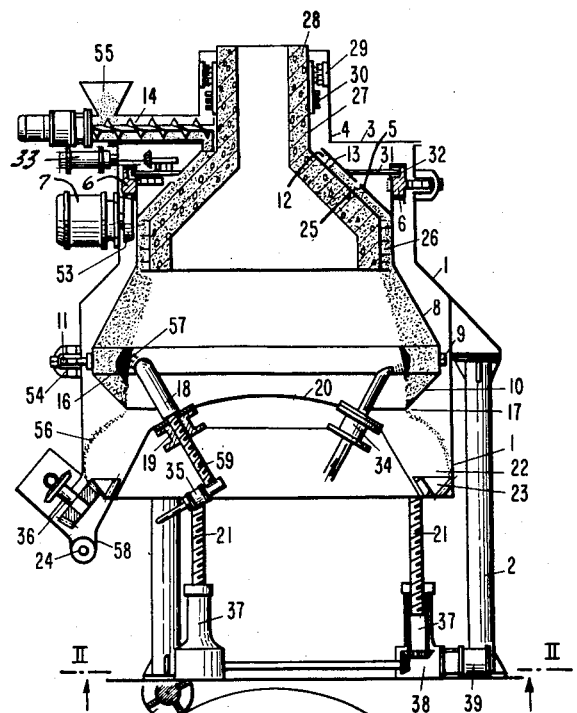
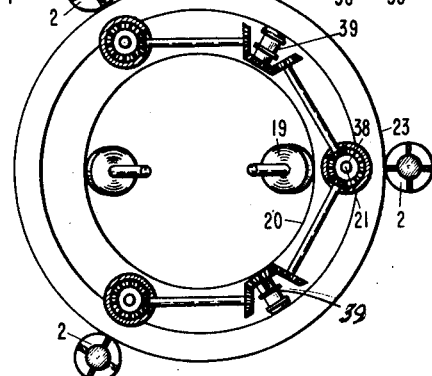
Fig. 2

United States Patent Office 3,180,915
Patented Apr. 27, 1965

3,180,915
METHOD FOR THE TREATMENT OF
RAW MATERIALS
Erwin Maier, Gotthart Michael Maier, and Johann
Imanuel Maier, all of Laufenburg, Baden, Germany, assignors to Oxymet AG, Baden, Switzerland
Filed Jan. 9, 1961, Ser. No. 81,620
Claims priority, application Switzerland, Jan. 12, 1960,
273/60
11 Claims. (Cl. 13—9)

The present invention relates to a quickly rotating electric arc furnace and to a method for its operation.

It is a principal object of the present invention to provide a rotary electric arc furnace capable of being operated at high voltages and low current intensities.

It is another object of the invention to provide a rotary electric arc furnace the interior of which, and the electrodes arranged therein, are easily accessible for inspection, repair or replacement, respectively.

It is yet another object of the invention to provide a method for operating a rotary electric arc furnace by which raw materials can be treated which initially are electrically poor conductive or not at all conductive.

With these and other objects in view which will become apparent later from this specification and the accompanying drawings, we provide a method for the treatment of raw materials which initially are substantially non-conductive, comprising the steps of quickly rotating a hollow furnace, applying said raw material to the inner wall surface of said furnace as a surface layer, making said material adhere as a surface layer to said surface by centrifugal force, applying an igniter layer of selected width to the said surface layer, applying at least one electric arc to said igniter layer, forming an annular reaction groove in said surface layer under said igniter layer, and confining the reactions in said furnace to said groove.

The igniter layer may consist of an exothermic, for example aluminothermic, self-heating material, or it may be formed out of the free surface of said layer of raw material by reacting it with an auxiliary flame impinging on it and, for example, superficially converting the same into slag.

The width of the reaction groove may be controlled electrically by varying the diameter of the electrodes or the distance thereof from the groove. By placing several electrodes at different but adjacent levels the width of said reaction groove may for example be increased.

The shape and size of said groove may be alternatively or additionally controlled mechanically by the way in which at least part of the raw material to be treated is supplied to the reaction groove.

The furnace according to the invention comprises in combination: a stationary shell and two truncated cones journalled co-axially with one another and with said stationary shell with annular spacing from one another, drive means in operation driving the said cones at differential rotational speeds, and feeder means supplying raw material to be treated into the annular interspace between the said two cones.

Preferably this furnace has a stationary bottom and a system of electrodes insulated from and mounted on such bottom with their free ends in juxtaposition with the inner surface of the outer one of said two truncated cones, said bottom and electrode system forming a self-contained unit axially movable relative to the rest of said furnace.

These and other features of our said invention will be clearly understood from the following description by way of example of a preferred embodiment thereof given with reference to the accompanying drawings, in which:

FIG. 1 is a vertical longitudinal section of a rotary electric furnace;

FIG. 2 is a cross section on the line II—II of FIG. 1, as seen in the direction of the arrow, some details being omitted;

Figure 4:
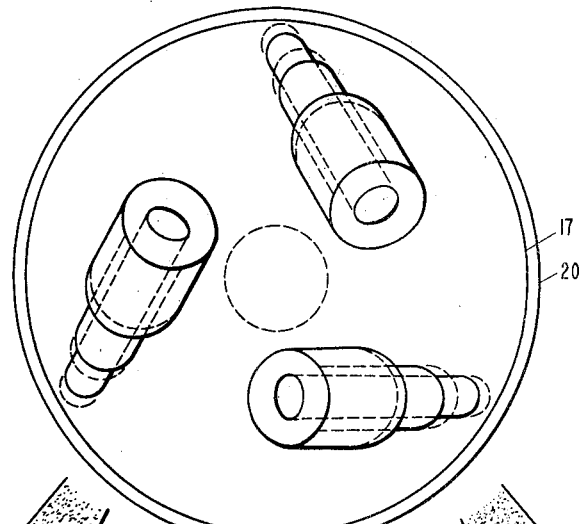
FIG. 4 is a view of the bottom portion in the direction of the arrows of FIG. 3.

In detail, the following structure of the rotary electric furnace follows from the accompanying drawings.

Its casing consists of a steel sheet shell 1, carried by three or four pillars 2. On top the casing is covered by a cover 3 having a cylindrical socket 4.

In the casing a cone 5 of steel sheet is rotatable, the tyre 6 of which is carried and driven by, for example, three driving rollers 53, each of which is mounted on the output shaft of a motor 7. These motors 7 are fixed to the outside of the casing 1. The steel sheet cone 5 is continued downwardly by another cone 8 and a short cylindrical portion having a tyre 9, thence terminating in an opposite cone 10. The tyre 9 is centered and guided by means of, for example, three rollers 11, which are substantially sheltered from the actions of the furnace and are mounted, accessible from outside, in capsules 54 on the casing 1. Inside the cone 5 rotates another cone 25 of smaller diameter, however at a differential velocity with respect to the outer cone 5, in order that the material 55 fed by a helix 14 to helical threads 26 arranged on cone 25 may advance downwardly into the inner space of the furnace, against a pyroplastic phase which may form and which cannot be overcome by the mere action of centrifugal and thrust force, as experience shows.

This inner cone 25 carries on top: a cylindrical extension 27 with refractory brick lining 28 serving as a chimney stack for the furnace, a labyrinth gland 29 and a set of slip rings 30 for the electricity supply. The inner cone 25 is held by a carrier steel plate 31 as is shown in FIG. 1 wherein the upwardly extending part of the frustro-conical shape of cone 25 is connected to the plate 31 by arms 13. The plate 31 is supported by means of a flange 32 on the driving ring 6. The parts 25, 13 and 31 are driven at a speed higher or lower than that of the outer cone 5, depending on whether it is a clockwise or anti-clockwise rotation, by a geared electric motor 33 connected to the slip rings 30.

The material 55 to be treated is fed by the helix 14 and drops into the interspace 12 between the conical sheet metal shells defining the walls of outer and inner cones 5 and 25 which is internally lined with fire bricks 28. To this introduced material 55 a downward thrust is applied by the action of gravity and of centrifugal force. At the same time it forms a coating of insulating material with respect to the annular reaction groove 16 forming opposite the electrodes 18. The material treated in this reaction groove 16 is fused; such liquid material is accordingly forced out of the reaction groove 16 and sinks down to the edge 17 of the shell from where it is sprayed off to the outer casing wall 1. Electric energy is transmitted to the reaction groove 16 by the arcs for example of three or six electrodes 18. These electrodes 18 are inserted from below into the interior of the furnace within the casing 1, by means of electrode holders 19, which are insulated from and mounted on a bottom 20. This bottom 20 is in turn capable of being lowered together with the electrode holders 19 and electrodes 18 by means of three hoist spindles 21, in order to be able to exchange the graphite electrodes or to repair any damage in the interior of the furnace, when necessary. In the bottom 20, in addition to the electrode holders, a longitudinally slidable tube 34 is attached for spraying a substance, such as an igniter layer or igniter flame on the surface of the reaction groove 16. The feed of the electrodes is effected by a geared motor 35 cooperating with a threaded spindle 59 of the electrode holder 19 (FIG. 2). A further geared motor 36 in the casing 58 serves for driving a toothed crown 23 for a scraper. The hoist spindles 21 are driven in unison by the gearings 38 arranged on the hoist stocks 37, for example by two geared motors 39 in order that no jamming may occur when raising or lowering an electrode-carrying bottom 20.

As is illustrated in FIG. 2, the dome shaped bottom 20 is lowered by means of the two motors 39 which operate the gearing 38 and the hoist stocks 37 to cause vertical movement of the threaded spindles 21. With such an arrangement, a simple operation permits the whole interior of the furnace to be accessible for dismantling and repair.

The sprayed off reaction material 57, for example metal, is cooled on the wall of the furnace casing 1 and then drops in granulated form into the collector trough 22 whence it is conveyed by a toothed scraper crown 23 to the trough 58 of a helix, and is finally discharged by the helix 24 therein for further use.

Figure 3:
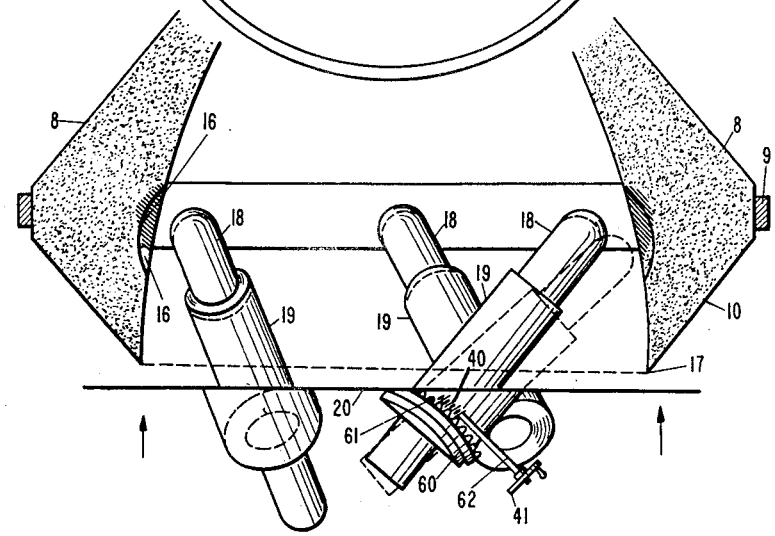
FIG. 3 is a detail of FIG. 1 on a larger scale, namely the bottom portion of the furnace.

In FIG. 3 the enlargement of the reaction groove 16 by the arrangement of pivotal electrode holders 19 is illustrated. These holders 19 are provided each with a collar 60 comprising a worm wheel segment 61 in mesh with a worm 40 which can be turned by a spindle 62 and a hand wheel 41, to the left or to the right, as desired. In FIGS. 3 and 4 the effect of this adjustment is illustrated in dotted lines as well as the variation in the shape of the reaction groove 16 caused thereby. In particular, the hatching in FIG. 3 shows that by pivoting the electrodes downward or by inserting thicker electrodes the reaction groove travels to a lower place in the furnace.

FIG. 4 shows in dotted lines a position of the electrodes lying closer to the reaction groove 16 than in the position shown in full lines. The result of this approach according to FIG. 4 is the formation of a deeper but narrower groove 16, corresponding approximately to the hatched profile in FIG. 3.

Figure 5:
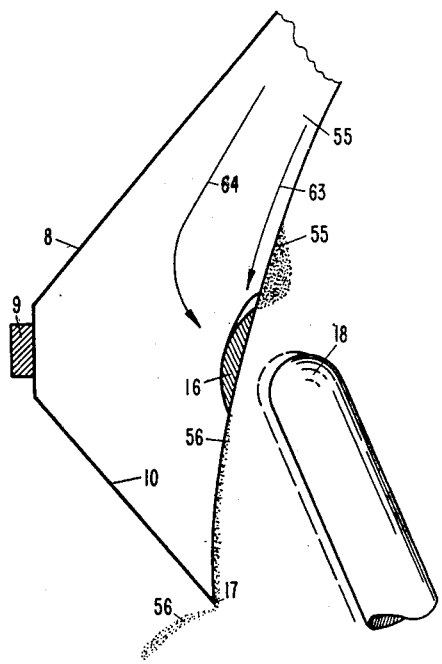
FIG. 5 is a diagrammatic detail of the reaction groove and its variation.

In FIG. 5 part of the reaction groove 16 corresponding to that of FIGS. 1 and 3 is illustrated. It will be seen, how by the increased feed of material 55 in the direction of the arrow the said groove is made to bulge-in from above, and the conductive area is reduced. Feed of the fresh material 55 in the direction of the arrow 63 will make the groove 16 narrower; when underpinning the groove 16 with fresh material 55 in the direction of the arrow 64 the groove is made more shallow.

It is a characteristic of the method described that the reaction groove 16 may be placed on any point of the furnace desired. This groove 16, although situated within the material to be treated, behaves physically and technologically quite differently from it. The layer of the material 55 forms structurally so to stay within the furnace treatment chamber adjacent the groove 16. This difference in behavior applies also to the discharge of the finally treated matter from the groove 16, provided this matter is liquid. This liquid 56 flows over the material to be treated 55 or seeps through it under the action of gravity and of centrifugal force, and flows towards the spraying-off edge 17 as if both were different materials, and without reacting with it, firmly adhering to it, or forming slag. In a regular run of the furnace the liquid (metal) is continuously thrown off from the edge 17 and likewise continuously flows from the groove 16.

Once the reaction groove 16 has been formed, it remains in existence throughout the whole of the further operation of the furnace, even when new material is fed into this groove for treatment from its margins or from the surface.

The extraordinary advantage and the considerable simplicity of the method described consist in that owing to the formation of this accurately defined groove the working process of the furnace takes place only therein, and that accordingly finished reactive matter can be contained only in it. This matter may be liquid, and in this case it can be very easily withdrawn from this sharply localized zone and out of the furnace. However the matter may alternatively be vaporised or gasified within this reaction groove.

In any case the extent of the treatment finally carried out in this groove can be accurately supervised and controlled, and accordingly the required replenishing of the groove can be at least estimated.

On the basis of experience, the profile and length of the reaction groove development can be determined for any individual case of operation and for any material to be treated. From such data, the nature of the material and the temperature gradient, the electrical resistance in operation is determined. The same depends on the length of the path of current and on the width of the band of current, apart from the electrical constants of the material to be treated, e.g. the variation of conductivity of the actual raw material with the variations in temperature. The width of the groove in turn depends, in a quite definite manner to be ascertained by tests, on the size of the electrodes, their angular position relative to the material and accordingly on the kind of electric arc forming, and to a less extent also on the width of the igniter layer.

The economic advantage always aimed at in the operation of electric furnaces for carrying out metallurgical and other processes is to be able to operate at high voltages and low current intensities, which is attained by the method described. The most favourable data for such voltages and current can even be calculated in advance; during operation they can moreover be regulated in the manner desired, since the voltages generated are determined in the first place by the profile of the reaction groove, and this profile is controllable during operation within wide limits.

In the method described for the operation of the furnace the following means, inter alia, are readily available for controlling the voltages and intensities of the current:

(a) The thickness and depth, respectively of the reaction groove is influenced mechanically in the simplest manner by the supply of new material to be treated from one side or from both sides or even from the ground below the reaction layer (underspinning). Its width can be mechanically reduced by an increased supply of new material to be treated from the surface of the groove. Moreover the width of the igniter layer applied to the material to be treated for initiating the working process has an effect on the formation of the surface width of the reaction groove.

(b) The width of the groove surface can moreover be influenced electrically by the distance of the electrodes from the surface of the layer to be treated; moreover by the angular position of the electrodes relative to the surface of the reaction groove, by the magnitude of the diameter of the electrodes and additionally in that the different electrodes acting on the reaction groove are not placed in the same plane.

The possibilities of influencing the groove according to (a) and (b) are independent of one another to a great extent. They supplement one another in accordance with the operation chosen.

Within the groove the reacted material is always more movable, particularly relative to the rest of the material fed into it and to the furnace containing the groove. The groove may contain the matter in the liquid phase or in finely divided solid form which gradually forms a bulge on the surface of the groove. The liquid phase or the bulge of the finally treated material may be scraped off from the groove, e.g. by means of conventional mechanical means. With regard to the material contained in the groove in the vapour or gaseous phase, it will escape therefrom by itself. In this case a cavity is formed within the flow of the material, as viewed from the form of the furnace.

The ignited layer may be composed of exothermic, e.g. aluminothermic heating substances which are applied during rotation of the furnace in the form of a ring onto the layer of raw material; the arcs of the electrodes act on this igniter layer in such a manner that below the igniter layer there is formed the reaction groove of molten metal which is now conductive. The igniter layer may alternatively be formed by superficially reacting the raw material (slag formation) by means of a heating flame.

While we have described herein and illustrated in the accompanying drawings what may be considered a typical and particularly useful embodiment of our invention, we wish it to be understood, that we do not limit ourselves to the particular details and dimensions described or illustrated inasmuch as obvious modifications will occur to a person skilled in the art.

What we claim as our invention and desire to secure by Letters Patent, is:

1. A method for the treatment of raw materials in a rotary electric arc furnace comprising the steps of feeding an electrically substantially non-conductive raw material to the furnace, rotating the fed material and forming the same into a surface layer by centrifugal force, applying an igniter layer of selected width to said surface layer, applying at least one electric arc to said igniter layer forming an annular reaction groove in said surface layer under said igniter layer, and confining the reactions in said furnace to said annular groove.

2. A method according to claim 1, wherein said igniter layer is applied in annular shape on said layer of raw material during the rotation of said furnace.

3. A method as claimed in claim 1 wherein said igniter layer is composed of exothermically heating substances.

4. A method as claimed in claim 1, wherein said igniter layer is composed of aluminothermically exothermic heating substances.

5. A method as claimed in claim 1, wherein said igniter layer is formed by superficial reaction of said raw material with an auxiliary flame.

6. A method as claimed in claim 1, wherein said igniter layer is formed on said raw material by superficially converting the same into slag by an auxiliary flame.

7. A method as claimed in claim 1, wherein the width of the said reaction groove is electrically controlled by shape and size of the electric arc applied to it.

8. A method as claimed in claim 1, wherein the width of the said reaction groove is controlled by applying electric arcs at different adjacent levels to it.

9. A method as claimed in claim 1, wherein the shape and size of the said reaction groove is mechanically controlled by supplying raw material to the said reaction groove.

10. A method as claimed in claim 9 wherein the width of the said reaction groove is narrowed by supplying raw material to its widest zone.

11. A method as claimed in claim 9, wherein the depth of the said reaction groove is controlled by supplying the material to be treated from at least one point of the arcuate profile of the said groove.

References Cited by the Examiner

UNITED STATES PATENTS

| | | | |
|---|---|---|---|
| 2,285,837 | 6/42 | Ridgway | 13—34 |
| 2,300,355 | 10/42 | Ellefsen | 13—34 |
| 2,427,037 | 9/47 | Winters | 13—10 |
| 2,744,944 | 5/56 | Striplin et al. | 13—10 |
| 2,878,004 | 3/59 | Saeman | 263—32 |

FOREIGN PATENTS 405,443   8/43   Italy.

OTHER REFERENCES

German printed application 1,037,079, 8/58.

RICHARD M. WOOD, *Primary Examiner.*